US012587633B1

(12) United States Patent
Yeh et al.

(10) Patent No.: US 12,587,633 B1
(45) Date of Patent: Mar. 24, 2026

(54) IMAGE CAPTURE DEVICE REGRESSION TESTING

(71) Applicant: Google LLC, Mountain View, CA (US)

(72) Inventors: Richard Cheng-I Yeh, Brooklyn, NY (US); Meir Elie Abergel, New York, NY (US); Peter Sherman, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/894,891

(22) Filed: Sep. 24, 2024

(51) Int. Cl.
| | |
|---|---|
| *H04N 17/02* | (2006.01) |
| *G06F 8/65* | (2018.01) |
| *G06T 7/00* | (2017.01) |
| *H04N 17/00* | (2006.01) |

(52) U.S. Cl.
CPC ............. *H04N 17/002* (2013.01); *G06F 8/65* (2013.01); *G06T 7/0002* (2013.01); *G06T 2207/30168* (2013.01)

(58) Field of Classification Search
CPC ........ H04N 17/002; H04N 5/232; G06F 8/65; G06T 7/0002; G06T 2207/30268
USPC .................................................. 348/180, 143
See application file for complete search history.

(56) References Cited

U.S. PATENT DOCUMENTS

| | | | | |
|---|---|---|---|---|
| 8,890,954 | B2 * | 11/2014 | O'Donnell | ..... H04N 21/234363 |
| | | | | 348/157 |
| 10,306,218 | B2 | 5/2019 | Shroff | |
| 11,798,151 | B1 * | 10/2023 | Deshmukh | ............ G06T 7/0002 |
| 12,257,025 | B2 * | 3/2025 | Soori-Arachi | ......... G06Q 50/01 |
| 2004/0032400 | A1 * | 2/2004 | Freeman | ............ H04N 1/00204 |
| | | | | 345/173 |
| 2009/0303324 | A1 * | 12/2009 | Greenhill | ............... H04N 7/181 |
| | | | | 706/45 |
| 2010/0302379 | A1 | 12/2010 | Liu | |
| 2013/0064531 | A1 * | 3/2013 | Pillman | .................. H04N 23/56 |
| | | | | 396/62 |
| 2024/0320119 | A1 * | 9/2024 | Karunamuni | ......... G06F 3/0488 |

FOREIGN PATENT DOCUMENTS

WO          2013153281 A1    10/2013

* cited by examiner

*Primary Examiner* — Trang U Tran
(74) *Attorney, Agent, or Firm* — Lowenstein Sandler LLP

(57) ABSTRACT

A method includes determining that software associated with an image capture device has received a software update. The method includes causing the image capture device to capture first one or more images of a testing environment. The method includes determining an image quality of the first one or more captured images. The method includes comparing the image quality of the first one or more captured images with a threshold image quality. The method includes, responsive to the image quality of the first one or more captured images being below the threshold image quality, causing the software update of the software associated with the image capture device to be automatically reverted.

15 Claims, 7 Drawing Sheets

100

Testing Management Sever 110

Testing Manager 112

Data Store 114

External Sever 140

Computer Network 150

Testing Environment 130

Physical Object(s) 132

Video Display 134

Client Device 120

Testing Application 122

Image Capture Device 124

100

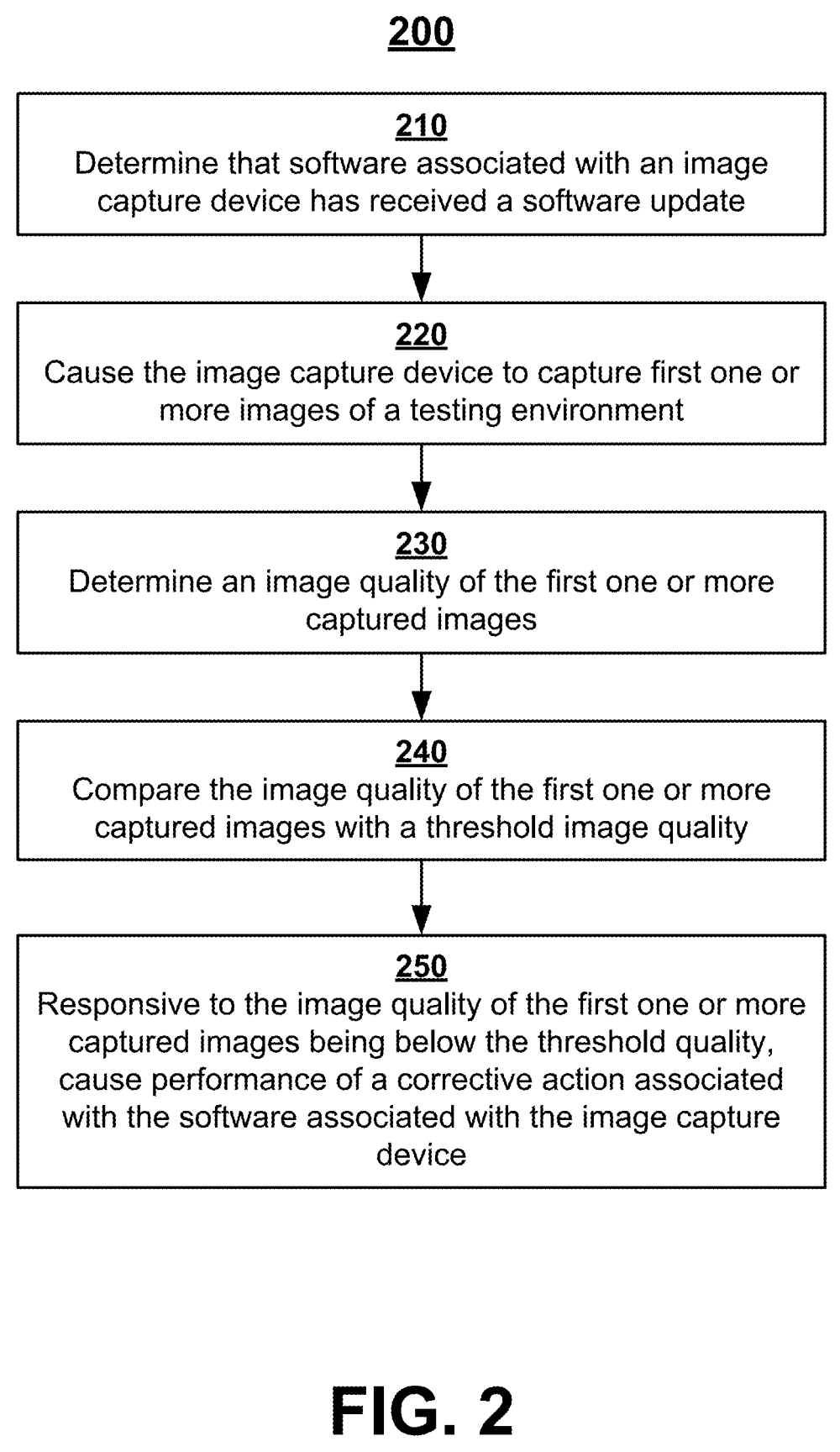

200

210
Determine that software associated with an image capture device has received a software update

220
Cause the image capture device to capture first one or more images of a testing environment

230
Determine an image quality of the first one or more captured images

240
Compare the image quality of the first one or more captured images with a threshold image quality

250
Responsive to the image quality of the first one or more captured images being below the threshold quality, cause performance of a corrective action associated with the software associated with the image capture device

FIG. 2

IMAGE CAPTURE DEVICE REGRESSION TESTING

TECHNICAL FIELD

The instant specification generally relates to computing devices. More specifically, the instant specification relates to image capture device regression testing.

BACKGROUND

Image capture devices (e.g., video cameras, photographic cameras) can generate image or video data. The data can be provided to a computing device for use by various types of software applications. Such software applications can include video conferencing applications and other virtual meeting applications.

SUMMARY

Disclosed herein are systems and methods for image capture device regression testing. One aspect of the disclosure includes a method. The method includes determining that software associated with an image capture device has received a software update. The method includes causing the image capture device to capture first one or more images of a testing environment. The method includes determining an image quality of the first one or more captured images. The method includes comparing the image quality of the first one or more captured images with a threshold image quality. The method includes, responsive to the image quality of the first one or more captured images being below the threshold image quality, causing the software update of the software associated with the image capture device to be automatically reverted.

Another aspect of the disclosure includes a system. The system includes a memory and a processing device, coupled to the memory, configured and/or otherwise programmed to perform one or more operations. The operations include determining that software associated with an image capture device has received a software update. The operations include causing the image capture device to capture first one or more images of a testing environment. The testing environment includes a humanoid-shaped object. The operations include determining an image quality of the first one or more captured images. The operations include comparing the image quality of the first one or more captured images with a threshold image quality. The operations include, responsive to the image quality of the first one or more captured images being below the threshold image quality, causing performance of a corrective action associated with the software associated with the image capture device.

Another aspect of the disclosure includes a non-transitory computer-readable storage medium that includes instructions. The instructions, responsive to being executed by a processing device, cause the processing device to perform one or more operations. The operations include determining that software associated with an image capture device has received a software update. The operations include causing the image capture device to capture first one or more images of a testing environment. The testing environment includes an optical lens disposed on an optical lens mount disposed in front of the image capture device. Causing the image capture device to capture the first one or more images of the testing environment includes causing the image capture device to capture the first one or more images through the optical lens. The operations include determining an image quality of the first one or more captured images. The operations include comparing the image quality of the first one or more captured images with a threshold image quality. The operations include, responsive to the image quality of the first one or more captured images being below the threshold image quality, causing performance of a corrective action associated with the software associated with the image capture device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flowchart illustrating an example method for practicing selected aspects of the present disclosure, in accordance with some implementations of the present disclosure.

DETAILED DESCRIPTION

Figure 1:
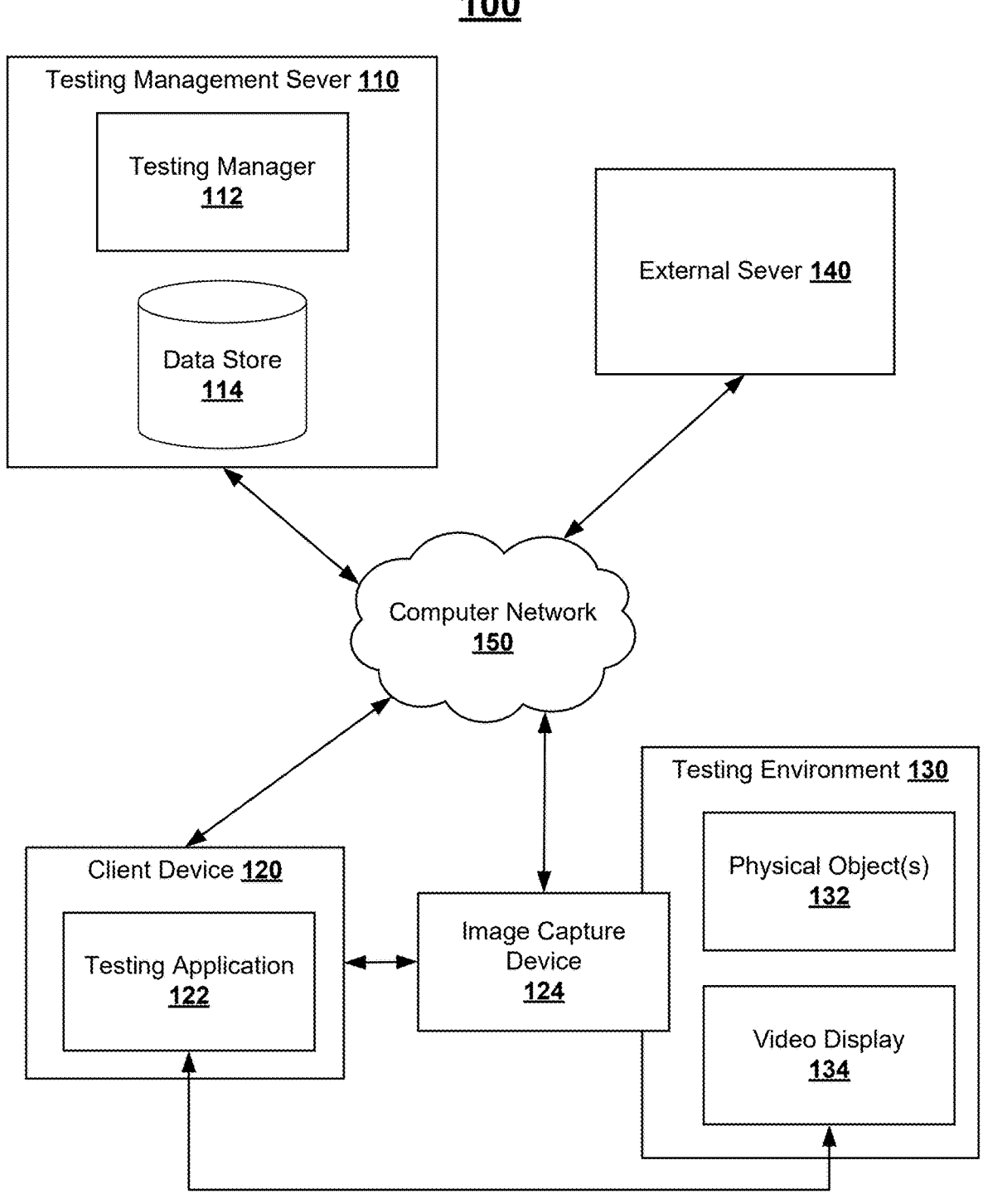
FIG. 1 schematically illustrates an example system for image capture device regression testing, in accordance with some implementations of the present disclosure.

Image capture devices, such as video cameras and photographic cameras, can generate image or video data. The data can be provided to a computing device for use by various types of software applications. Such software applications can include video conferencing applications. The image capture device may include firmware that executes on the image capture device and performs operations related to capturing and processing images.

A manufacturer of an image capture device, a developer of the firmware of the image capture device, or a developer of a software application that uses the image capture device may test the image capture device to determine the quality of the images generated by the image capture device. However, testing image capture devices is often expensive because such testing often involves using high-cost testing equipment. Testing image capture devices is also often manual, relying on human evaluation, ill-defined calibration standards, and varying lighting conditions.

Aspects and implementations of the present disclosure address the above deficiencies, among others, by providing automated processes that test image capture devices and related software using economical equipment. Aspects and implementations of the present disclosure include a computing device which determines that software associated with an image capture device (e.g., firmware of the device or software that processes images obtained from the device) has received an update. The computing device can cause the image capture device to capture images of a testing environment, determine image quality-related data for the images, and compare the image quality data to a threshold image quality (e.g., an image quality determined by an artificial intelligence (AI) model or previous image quality data) to determine whether the image quality has regressed. If so, the computing device can cause the performance of a corrective action associated with the software of the image capture device. The testing environment may include low-cost physical objects or other testing equipment.

Aspects and implementations of the present disclosure provide advantages over conventional image capture device testing systems and methods by providing automated image capture device testing processes that do not rely on manual evaluation of images, ill-defined calibration standards, or the like. Furthermore, aspects and implementations of the present disclosure provide testing equipment that is economical and easy for end users to utilize. Additionally, aspects and implementations of the present disclosure can perform the automated testing processes quickly and without interrupting the operation of the image capture devices or without needing to reboot the image capture devices.

In addition, some benefits of the present disclosure can provide a technical effect caused by or resulting from a technical solution to a technical problem. For example, one technical problem can relate to degradation of image capture device quality caused by a software update. One of the technical solutions to the technical problem may include an automated testing process that detects the degradation of the image capture device quality and causes a corrective action to be performed. As a consequence, image capture device degradation is reduced or eliminated.

FIG. 1 depicts an example system 100 for image capture device regression testing, in accordance with some implementations. The system 100 may include a testing management server 110, a client device 120, an image capture device 124, a testing environment 130, an external server 140, or a computer network 150. The testing management server 110 may include a testing manager 112 or a data store 114. The client device 120 may include a testing application 122 in data communication with the image capture device 124. The testing environment 130 may include one or more physical objects 132 or a video display 134. In some implementations, the testing management server 110, the client device 120, or the external server 140 can be in data communication over the computer network 150.

In one implementation, the testing management server 110 includes one or more computing devices. A computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM includes a system virtual machine, which may include a VM that emulates an entire physical computing device. A VM may include a process virtual machine, which may include a VM that emulates an application or some other software. A container may include a computing environment that logically surrounds one or more software applications independently of other applications executing in a cloud computing environment.

In one or more implementations, the testing management server 110 enables the client device 120 to connect with the testing manager 112 to provide images from the image capture device 124 for testing. The testing management server 110 can coordinate with other components of the system 100 to assist the testing manager 112 in testing images obtained from the client device 120. The testing management server 110 and the client device 120 can interact in a server-client architecture, in some implementations. The testing management server 110 can be owned, operated, or controlled by a first entity, and the client device 120 can be owned, operated, or controlled by a separate entity that can be a customer or subscriber of the first entity.

In some implementations, the testing manager 112 includes a software application (or subset thereof) that performs image quality testing functionality. The testing manager 112 can obtain one or more images captured by an image capture device (e.g., the image capture device 124) and perform one or more image quality testing operations on images. Responsive to the one or more image quality testing operations indicating that image quality of an image capture device has regressed, the testing manager 112 can cause a corrective action to be performed associated with software associated with the image capture device. Further information regarding the testing manager 112 is provided below in relation to FIG. 2.

The testing management server 110 may include the data store 114. In some implementations, the data store 114 is a persistent storage that is capable of storing data as well as data structures to tag, organize, and index the data. A data item may include image data, calibration image data, image testing data, or other types of data, in accordance with implementations described herein. The data store 114 can be hosted by one or more storage devices, such as main memory, magnetic or optical storage-based disks, tapes, hard drives, flash memory, and so forth. In some implementations, the data store 114 is a network-attached file server, while in other implementations, the data store 114 is some other type of persistent storage such as an object-oriented database, a relational database, and so forth. The data store 114 can be hosted by the testing management server 110, or the data store 114 can be hosted on one or more separate computing devices coupled to the testing management server 110 using the computer network 150.

In some implementations, the client devices 120 includes a computing device such as a personal computer (PC), laptop, mobile phone, smart phone, tablet computer, netbook computer, network-connected television, etc. The client device 120 can also be referred to as a "user device." A user of the client device 120 can operate the client device 120. In some implementations of the disclosure, a "user" can be represented as a single individual. However, other implementations of the disclosure encompass a "user" being an entity controlled by a set of users or an organization. In situations in which the systems discussed here collect personal information about users, or can make use of personal information, the users can be provided with an opportunity to control whether the testing management server 110 collects user information (e.g., information about a user's social network, social actions or activities, profession, a user's preferences, or a user's current location), or to control whether and/or how to receive content from the testing management server 110 that can be more relevant to the user.

In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the testing management server 110.

The client device 120 may include a testing application 122. The testing application 122 may include a mobile application, a desktop application, a web browser, etc. The testing application 122 can perform operations to test or control the image capture device 124. In some implementations, the testing application 122 is in data communication with the testing manager 112 and performs one or more of the testing operations responsive to obtaining instructions, commands, requests, or other data from the testing manager 112. For example, the testing manager 112 may execute in a cloud computing environment and may send data to the testing application 122 that causes the testing application to perform the one or more testing operations. The testing application 122 may include a cloud service or may be in data communication with a cloud service of the client device 120, and the cloud service may obtain the data from the testing manager 112.

In some implementations, as depicted in FIG. 1, the testing management server 110 may include the testing manager 112. The testing management server 110 may include one or more computing devices that include more computing resources (e.g., processing power, memory, data storage, etc.) than the client device 120 and, thus, the testing manager 112 being hosted on the testing management server 110 while performing image quality testing operations can be more efficient than the testing manager 112 being hosted on the client device 120. In some implementations, the client device 120 may include the testing manager 112. The testing manager 112 being hosted on the client device 120 can allow the client device 120 to perform image quality testing operations without sending images obtained from the image capture device 124 over the computer network 150 or without waiting for computing resources of the testing management server 110 to be freed up from other uses.

In some implementations, the image capture device 124 includes a device configured and/or otherwise programmed to capture images or video using an image sensor and other components. The image capture device 124 may include a camera, such as a webcam, a camera built into a mobile device, or a conference room camera. The image capture device 124 can be in data communication with the client device 120. For example, the image capture device 124 may be connected to the client device 120 using a cable (e.g., a Universal Serial Bus (USB) cable) or a wireless connection (e.g., Wi-Fi) or the image capture device 124 can be embedded into the circuitry of the client device 120. In another example, the image capture device 124 may be in data communication with the client device 120 over the computer network 150 (e.g., the image capture device 124 may include an Internet Protocol (IP) camera). The image capture device 124 can send one or more captured images to the client device 120. In some implementations, the image capture device 124 includes firmware that operates one or more components of the image capture device 124.

In one implementation, the testing environment 130 includes a controlled space to evaluate the performance of the image capture device 124. The testing environment 130 can be "controlled" in that one or more aspects of the testing environment (e.g., lighting, calibration images, objects, etc.) can conform to predetermined conditions so that such aspects are reproducible or made consistent at different times in order to test the image capture device 124. The testing environment 130 may include one or more physical objects 132 (e.g., camera mounts, lens mounts, or humanoid-shaped objects). The testing environment 130 may include a video display 134 to display one or more testing images. The video display 134 can be in data communication with the testing application 122 (e.g., the video display 134 can display a testing image the testing application 122 provides). Further information regarding the testing environment 130 is provided below in relation to FIG. 3.

In one or more implementations, the external server 140 may include a computing device that is separate from the testing management server 110 and the client device 120. The external server 140 can be owned, operated, or controlled by an entity separate from the entity that operates the testing management server 110 or the client device 120. The external server 140 can provide data to the testing management server 110, the client device 120, or the image capture device 124. The external server 140 can provide a firmware update for the firmware of the image capture device 124. The external server 140 can provide a software update for image processing software of the client device 120. The external server 140 can provide other types of data.

In some implementations, the computer network 150 includes a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, by separating the testing management server 110 and the client device 120, multiple providers of image capture devices 124 can conduct image quality testing in parallel. Furthermore, a provider of an image capture device 124 can use multiple testing environments 130 to test multiple image capture devices 124 sequentially or in parallel.

FIG. 2 is a flowchart illustrating an example method 200 for image capture device regression testing, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 200 and/or one or more of the method's 200 individual functions, routines, subroutines, or operations. In certain implementations, a single processing thread can perform the method 200. Alternatively, two or more processing threads can perform the method 200, each thread executing one or more individual functions, routines, subroutines, or operations of the method. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In some implementations, the testing manager 112 performs one or more of the operations of the method 200.

At block 210, processing logic determines that software associated with the image capture device 124 has received a software update. In one implementation, the software associated with the image capture device 124 includes firmware of the image capture device 124. In some implementations, the software associated with the image capture device 124 includes image capture software of the client device 120 connected to the image capture device 124. The image capture software may include software executing on the client device 120 that can obtain data from the image capture device 124 and can generate image or video data based on the data from the image capture device 124.

In some implementations, the testing manager 112 can determine that the software associated with the image capture device 124 has received the software update. For example, the client device 120 can provide data to the testing manager 112 indicating that the software associated with the image capture device 124 has received the software update. In another example, the external server 140 can provide data to the testing manager 112 indicating that the software associated with the image capture device 124 has received the software update (e.g., the external server 140 may include a server that provides software updates to the software associated with the image capture device 124).

At block 220, processing logic causes the image capture device 124 to capture first image(s) of the testing environment 130. Causing the image capture device 124 to capture first image(s) of the testing environment 130 may include the testing manager 112 providing an instruction or other data to the testing application 122. In response, the testing application 122 can cause the image capture device 124 to capture the first image(s) of the testing environment 130. The image capture device 124 can capture image data and provide the captured image data to image capture software of the client device 120. The image capture software can process the image data and can generate the first image(s) based on the image data.

In some implementations, the method 200 may further include causing the video display 134 of the testing environment 130 to present one or more testing images while the image capture device 124 captures the first image(s). A testing image may include an image that includes content allowing testing software to test a certain aspect of an image. For example, a testing image may include a black-and-white checkered pattern for testing contrast or sharpness. A testing image may include portions of different color for testing color accuracy. The testing image may include other content for testing image resolution, white balance, noise, or other image quality measurements.

In one implementation, block 220 may include causing the image capture device 124 to capture an image of a humanoid-shaped object. The one or more physical objects 132 of the testing environment 130 may include a humanoid-shaped object. A humanoid-shaped object may include an object that is shaped, at least in part, like a human. The humanoid-shaped object may include a circular or oval portion (corresponding to a head) mounted on another portion of a different shape (corresponding to a body). The head portion may include facial features (e.g., a nose, ears, a mouth, eyes, etc.). The body portion may include body features (e.g., shoulders, arms, a torso, etc.). Capturing images of a humanoid-shaped object can help the testing manager 112 determine how well the image capture device 124 would perform capturing images of humans in a real-world application (e.g., a video conference).

In some implementations, the testing environment 130 includes an optical lens. The optical lens can be disposed on an optical lens mount, and the optical lens mount can be disposed in front of the image capture device 124. The optical lens may include a lens separate from a lens integrated into the image capture device 124. The optical lens may include a lens that augments the image captured by the image capture device 124. The optical lens can cause the image to be more in-focus or more out-of-focus, cause the image to contain different colors, or can augment the image in other ways. The optical lens can modify the lighting conditions of the testing environment 130. The optical lens may include one or more lenses and/or filters. Using the optical lens can allow the image capture device 124 to capture images with different aspects or qualities to allow the testing manager 112 to test additional properties of the image capture device 124. Causing the image capture device 124 to capture the first image(s) of the testing environment 130 may include causing the image capture device 124 to capture the first image(s) through the optical lens.

At block 230, processing logic determines an image quality of the first captured image(s). The testing application 122 can provide the first captured image(s) to the testing manager 112, and the testing manager 112 can obtain the first captured image(s). The testing manager 112 can perform one or more image quality testing operations on the first captured image(s). The image quality testing operations can generate an output indicating an image quality of the first captured image(s). In one implementation, the one or more image quality testing operations may include testing operations for color accuracy, image resolution, white balance, exposure, noise, sharpness, contrast, or other image quality measurements.

In one or more implementations, the image quality of the first captured image(s) is determined using an AI model and using the first captured image(s) as input to the AI model. The AI model may include an AI model trained to determine the image quality of one or more captured images provided to the AI model as a human would perceive the image quality of the one or more captured images. Further details regarding the AI model are provided below in reference to FIG. 5 and FIG. 6.

In some implementations, the first captured image(s) include multiple images that the image capture device 124 captured sequentially. For example, the first captured image(s) may include frames of a video captured by the image capture device 124. Determining an image quality of the first captured image(s) includes determining an image quality based on the multiple sequential images. For example, the testing manager 112 can perform an image quality testing operation for exposure, which may include determining a reaction time of the image capture device 124. Performing the image quality testing operation for exposure may include imposing a lighting change in the testing environment 130, causing the image capture device 124 to capture multiple sequential images as the first captured image(s), and determining a reaction time of the image capture device based on the multiple sequential images. The testing manager 112 may determine other image qualities based on multiple sequential images captured by the image capture device 124.

At block 240, processing logic compares the image quality of the first captured image(s) with a threshold image quality. In one implementation, the threshold image quality includes an image quality of second one or more images captured by the image capture device 124. The second images may include images captured by the image capture device 124, and the second images may have been captured prior to the software receiving the software update. In one or more implementations, the threshold image quality includes an image quality provided to the testing manager 112 via user input (e.g., a user of the testing management server 110 or the client device 120 may use a user interface (UI) associated with the testing manager 112 to input data that indicates the threshold image quality). The threshold image quality may include an image quality determined by an AI model or other image analysis software.

In one implementation, comparing the image quality of the first captured image(s) with the threshold image quality includes comparing an image characteristic of the first captured image(s) with the same image characteristic of the threshold image quality. For example, the testing manager 112 can compare a measurement value for a color accuracy of the first captured image(s) with a measurement value for a color accuracy of the threshold image quality. In another example, the testing manager 112 can compare a measurement value for a sharpness of the first captured image(s) with a measurement value for a sharpness of the threshold image quality. In some implementations, comparing the image quality of the first captured image(s) with the threshold image quality may include comparing an overall image quality value of the first captured image(s) with an overall image quality value of the threshold image quality. An overall image quality value may include a value indicating image quality based on multiple aspects of image quality.

As discussed above, in some implementations, the first captured image(s) include multiple sequential images captured by the image capture device 124. Similarly, where the threshold image quality includes an image quality of second one or more images captured by the image capture device 124, the second images may include multiple sequential images. The threshold image quality may be based on the multiple sequential images of the second one or more images (e.g., an exposure of the second one or more images).

At block 250, responsive to the image quality of the first captured image(s) being below the threshold image quality, processing logic causes performance of a corrective action associated with the software associated with the image capture device 124. In some implementations, the image quality of the first captured image(s) being below the threshold quality indicates a regression in image quality of the image capture device 124.

The image quality of the first captured image(s) being below the threshold image quality may include one or more measurement values of the first captured image(s) being lower than one or more measurement values of the threshold image quality. For example, a measurement value can correspond to color accuracy, and the measurement value may include a number between 0 (lowest color accuracy) and 1 (highest color accuracy). If the measurement value for the first captured image(s) is 0.6 and the measurement value for the threshold image quality is 0.9, then the image quality of the first captured image(s) may be below the threshold image quality and may indicate a regression in image quality.

In one implementation, the corrective action includes reverting the software update of the software associated with an image capture device 124. The testing manager 112 causing the software update to be reverted may include the testing manager 112 providing data to the client device 120. The data may include an instruction for an application of the client device 120 to revert the software update. The application of the client device 120 may include the testing application 122; an application that installs, updates, or manages firmware of the image capture device 124; or an application that installs, updates, or manages image processing software of the client device 120. In response to obtaining the instruction, the application can revert the software update. Reverting the software update may include removing the software update and applying a previous version of the software associated with the image capture device 124. In some implementations, the data provided by the testing manager 112 may include the current version of the software, the previous version of the software, or may include instructions that the application can use to obtain the previous version of the software.

In some implementations, the corrective action includes providing an alert to a computing device associated with an entity that provided the software update. The alert may include a message, a notification, or other data that can inform the entity that the software update caused a regression in image quality of the image capture device 124. The message, notification, or other data may include an on-screen message in a software application, an email, or some other type of message or notification.

In some implementations, a comparison of the image quality of the first captured image(s) with the threshold image quality indicates a change in the image quality of the image capture device 124. The change may include a change in the image quality other than a regression in the image quality. Responsive to the comparison indicating a change in the image quality, processing logic may cause performance of a reactive action. The reactive action may include providing an alert displayable on a display device of the testing management server 110. The reactive action may include providing an alert to a computing device associated with an entity that provided the software update. The alert may include a message, a notification, or other data that indicates that the software update caused a change in image quality of the image capture device 124. The message, notification, or other data may include an on-screen message in a software application, an email, or some other type of message or notification.

In one implementation, the computing device associated with the entity includes the external server 140. As discussed above, the external server 140 can provide a firmware update for the firmware of the image capture device 124, or the external server 140 can provide a software update for image processing software of the client device 120. In some implementations, the external server 140 implements an application programming interface (API) of a software application that executes on the external server 140. The testing manager 112 can send data to the software application using the API, and the data may include the alert.

Figure 3:
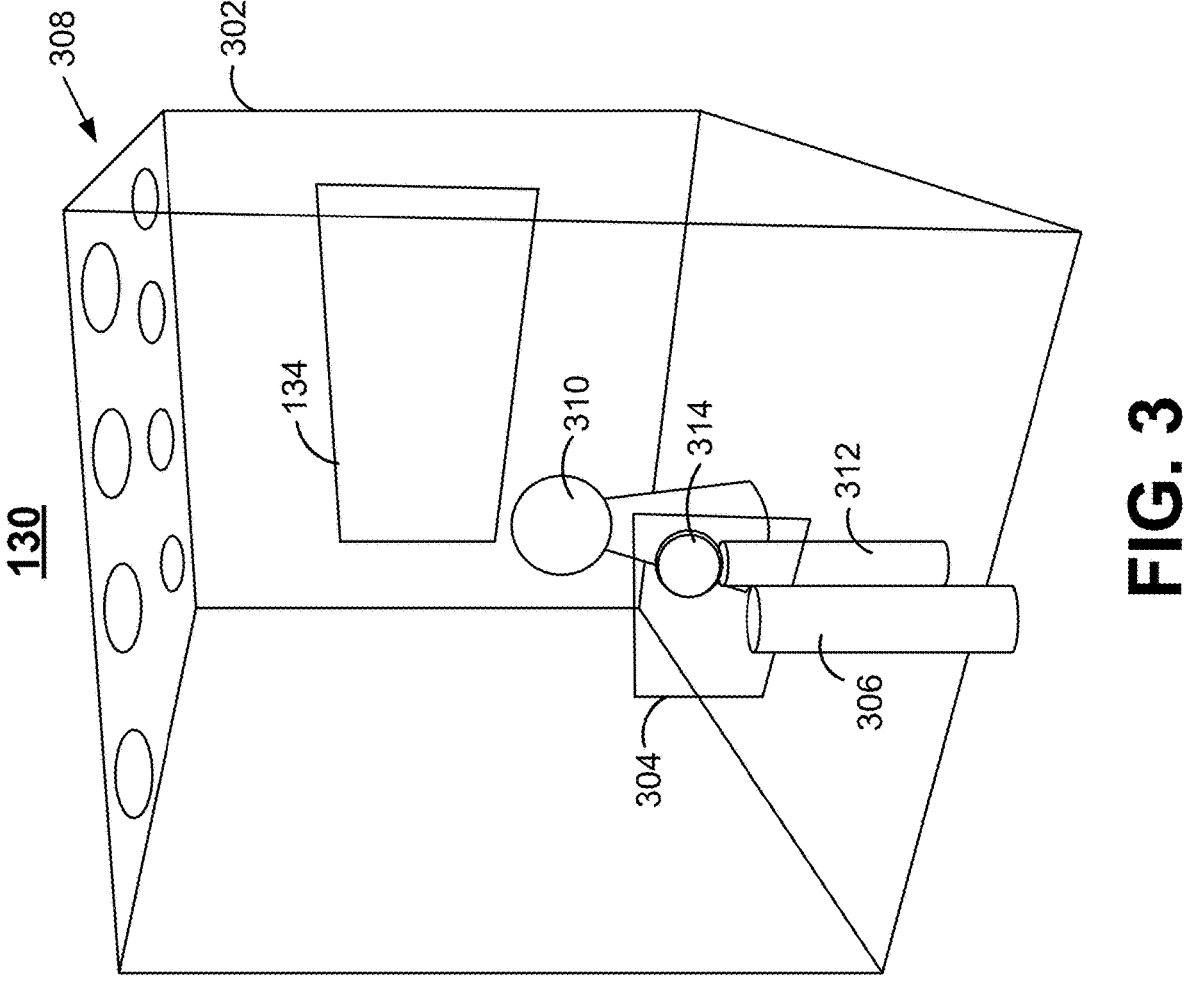
FIG. 3 depicts a perspective view illustrating an example testing environment for image capture device regression testing, in accordance with some implementations of the present disclosure.

FIG. 3 depicts an example testing environment 130 for image capture device regression testing, in accordance with some implementations of the present disclosure. The testing environment 130 may include an enclosure 302. The enclosure 302 may include a structure that at least partially surrounds an interior space within the enclosure 302. The enclosure 302 can assist in controlling conditions of the interior space. Such conditions may include lighting, the placement of objects, or other conditions.

In some implementations, the enclosure 302 includes one or more walls, a ceiling, or a floor. The walls, ceiling, or floor may include panels that prevent light or air gusts from entering the enclosure 302. The walls, ceiling, or floor may include a rigid material. It should be noted that while FIG. 3 depicts the ceiling, walls, and floor as transparent, this depiction is only to allow viewing of the interior space of the enclosure 302.

In one or more implementations, the enclosure 302 may include one or more apertures that can allow a user of the testing environment to arrange objects disposed within the enclosure 302. The user can selectably open or close an aperture. For example, the enclosure 302 may include one or more hinges disposed at a location where two walls meet, and the hinges can allow the user to selectably open or close a side of the enclosure 302.

In one implementation, the enclosure 302 includes an image capture aperture 304 through which the image capture device 124 can capture one or more images of the interior of the enclosure 302. The testing environment 130 may include a camera mount 306 disposed near the image capture aperture 304. The camera mount 306 may include a structure that is sized and shaped to support the image capture device 124 when disposed on the camera mount 306. The camera mount 306 can be disposed outside of the enclosure 302, or the camera mount 306 can be disposed inside the enclosure 302.

In some implementations, the enclosure 302 may include one or more lights 308. The one or more lights 308 may include lighting fixtures or other lighting devices that illuminate at least a portion of the interior of the enclosure 302. The one or more lights 308 can be disposed on the ceiling of the enclosure 302, one or more walls of the enclosure 302, or the floor of the enclosure 302. The testing application 122 of the client device 120 can control one or more of the lights 308.

The testing environment 130 may include the video display 134. The video display 134 can be disposed on a wall of the enclosure 302, suspended from the ceiling of the enclosure 302, or supported by the floor of the enclosure 302. As discussed above, the testing application 122 can be in data communication with the video display 134. The testing application 122 can cause the video display to display one or more testing images.

The testing environment 300 may include a humanoid-shaped object 310. The humanoid-shaped object 310 can be disposed within the enclosure 302. As discussed above, the humanoid-shaped object 310 may include an object that is shaped, at least in part, like a human. The humanoid-shaped object 310 may include a circular or oval portion (corresponding to a head) mounted on another portion of a different shape (corresponding to a body). The head portion may include facial features (e.g., a nose, ears, a mouth, eyes, etc.). The body portion may include body features (e.g., shoulders, arms, a torso, etc.). Capturing images of the humanoid-shaped object 310 can help the testing manager 112 determine how well the image capture device 124 would perform capturing images of humans in a real-world application (e.g., a video conference). In one or more implementations, the testing environment 300 may include other objects that can simulate real-world objects so the testing manager 112 can determine how well the image capture device 124 would perform capturing images of such objects in a real-world application. Such objects may include a table, a chair, other types of furniture, or other types of objects.

In some implementations, the testing environment 130 includes an optical lens mount 312. The optical lens mount 312 may include a structure on which an optical lens 314 can be disposed. As discussed above, the optical lens 314 may include a lens that augments an image captured by the image capture device 124. The optical lens mount 312 can be disposed near the image capture aperture 304 to allow the image capture device 124 to capture one or more images of the interior of the enclosure 302 through the optical lens 314.

In one implementation, one or more components of the testing environment 130 can be made of materials that can be quick and economical to produce. For example, one or more of the components of the testing environment 130 can be made of, at least in part, a plastic and can be constructed by an additive manufacturing process. Such components may include the enclosure 302, the camera mount 306, the humanoid-shaped object 310, other objects disposed within the enclosure 302, or the optical lens mount 312.

In one implementation, the testing manager 112 can determine the image capture device's 124 compliance with an API of a virtual meeting application. The virtual meeting application may include software that hosts a virtual meeting or connects the client device 120 to a virtual meeting.

Figure 4:
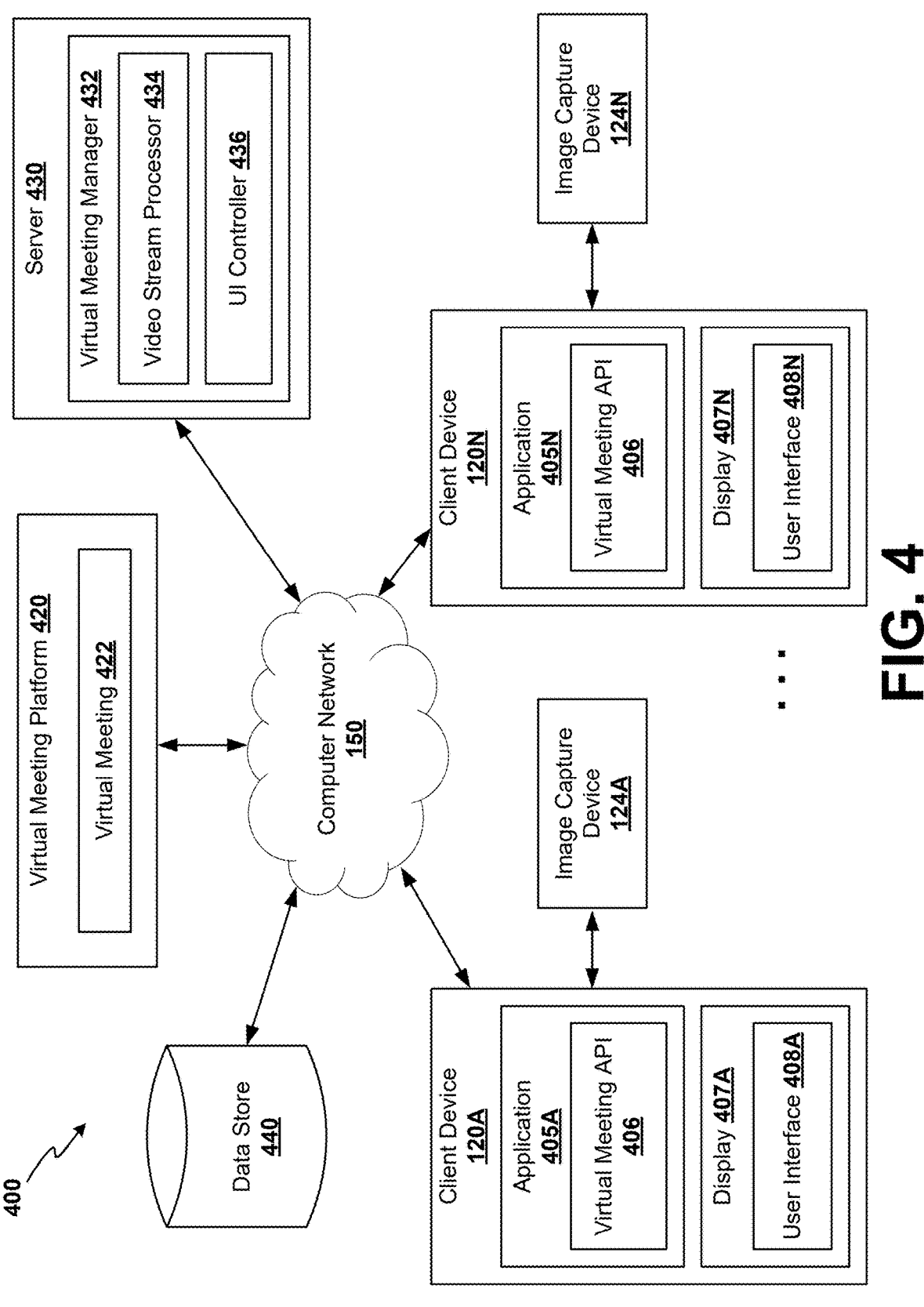
FIG. 4 depicts a schematic view illustrating an example system architecture for implementing a virtual meeting, in accordance with some implementations of the present disclosure.

FIG. 4 depicts a schematic view illustrating an example system architecture 400 for implementing a virtual meeting, in accordance with some implementations of the present disclosure. The system architecture 400 includes one or more client devices 120A-N (which may include the client device 120 of FIG. 1), a virtual meeting platform 420, a server 430, and a data store 440, each connected to the computer network 150.

In some implementations, the virtual meeting platform 420 enables users of one or more of the client devices 120A-N to connect with each other in a virtual meeting (e.g., a virtual meeting 422). A virtual meeting 422 can refer to a real-time communication session such as a video-based call or video chat, in which participants can connect with multiple additional participants in real-time and be provided with audio and video capabilities. A virtual meeting 422 may include an audio-based call or chat, in which participants connect with multiple additional participants in real-time and are provided with audio capabilities. Real-time communication refers to the ability for users to communicate (e.g., exchange information) instantly without transmission delays and/or with negligible (e.g., milliseconds) latency. The virtual meeting platform 420 can allow a user of the virtual meeting platform 420 to join and participate in a virtual meeting 422 with other users of the virtual meeting platform 420 (such users sometimes being referred to, herein, as "virtual meeting participants" or, simply, "participants"). Implementations of the present disclosure can be implemented with any number of participants connecting via the virtual meeting 422 (e.g., up to one hundred or more).

In some implementations, the server 430 includes a virtual meeting manager 432. The virtual meeting manager 432, in one or more implementations, is configured and/or otherwise programmed to manage a virtual meeting 422 between multiple users of the virtual meeting platform 420. The virtual meeting manager 432 can provide a UI 408A-N to each client device 120A-N to enable users to watch and listen to each other during a virtual meeting 422. The virtual meeting manager 432 can also collect and provide data associated with the virtual meeting 422 to each participant of the virtual meeting 422. In some implementations, the virtual meeting manager 432 provides the UIs 408A-N for presentation by client applications 405A-N. For example, the respective UIs 408A-N can be displayed on the display devices 407A-N by the client applications 405A-N executing on the operating systems of the client devices 120A-N. In some implementations, the virtual meeting manager 432 determines visual items for presentation in the UIs 408A-N during a virtual meeting. A visual item can refer to a UI element that occupies a particular region in the UI 408A-N and is dedicated to presenting a video stream from a respective client device. Such a video stream can depict, for example, a user of the respective client device 120A-N while the user is participating in the virtual meeting 422 (e.g., speaking, presenting, listening to other participants, watching other participants, etc., at particular moments during the virtual meeting 422), a physical conference or meeting room (e.g., with one or more participants present), a document or media content (e.g., video content, one or more images, etc.) being presented during the virtual meeting 422, etc.

In some implementations, the virtual meeting manager 432 includes a video stream processor 434 and a UI controller 436. Each of the video stream processor 434 or the UI controller 436 may include a software application (or a subset thereof) that performs certain virtual meeting functionality for the virtual meeting manager 432. The video stream processor 434 can be configured and/or otherwise programmed to receive video streams from one or more of the client devices 120A-N. The video stream processor 434 can be configured and/or otherwise programmed to determine visual items for presentation in the UI 408A-N of such client devices 120A-N during the virtual meeting 422. Each visual item can correspond to a video stream from a client device 120A-N (e.g., the video stream pertaining to one or more participants of the virtual meeting 422). In some implementations, the video stream processor 434 receives audio streams associated with the video streams from the client devices (e.g., from an audiovisual component of the client devices 120A-N). Once the video stream processor 434 has determined visual items for presentation in the UI 408A-N, the video stream processor 434 can notify the UI controller 436 of the determined visual items. The visual items for presentation can be determined based on current speaker, current presenter, order of the participants joining the virtual meeting 422, list of participants (e.g., alphabetical), etc.

In some implementations, the UI controller 436 provides the UI for the virtual meeting 422 (e.g., the UI 408A-N). The UI can include multiple regions. Each region can display a video stream pertaining to one or more participants of the virtual meeting 422. The UI controller 436 can control which video stream is to be displayed by providing a command to one or more client devices 120A-N that indicates which video stream is to be displayed in which region of the UI (along with the received video and audio streams being provided to the client devices 120A-N). For example, in response to being notified of the determined visual items for presentation in the UI 408A-N, the UI controller 436 can transmit a command causing each determined visual item to be displayed in a region of the UI and/or rearranged in the UI.

In some implementations, each of the virtual meeting platform 420 or the server 430 include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 422. The virtual meeting platform 420 can also include a website (e.g., one or more webpages) or application back-end software that can be used to enable a user to connect with other users by way of the virtual meeting 422.

In some implementations, the data store 440 is a persistent storage that is capable of storing data as well as data structures to tag, organize, and index the data. A data item can include audio data and/or video stream data, in accordance with implementations described herein. The data store 440 can be hosted by one or more storage devices, such as main memory, magnetic or optical storage-based disks, tapes, hard drives, flash memory, and so forth. In some implementations, the data store 440 is a network-attached file server, while in other implementations, the data store 440 is some other type of persistent storage such as an object-oriented database, a relational database, and so forth, that can be hosted by the virtual meeting platform 420 or one or more different machines (e.g., the server 430) coupled to the virtual meeting platform 420 using the computer network 150. In some implementations, the data store 440 stores portions of audio and video streams received from one or more client devices 120A-N for the virtual meeting platform 420. Moreover, the data store 440 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 120A-N and/or concurrently editable by the users.

It should be noted that in some implementations, the functions of the virtual meeting platform 420 or the server 430 are provided by a fewer number of machines. For example, in some implementations, the server 430 is integrated into a single machine, while in other implementations, the server 430 is integrated into multiple machines. In addition, in one or more implementations, the server 430 is integrated into the virtual meeting platform 420.

In general, one or more functions described in the several implementations as being performed by the virtual meeting platform 420 or server 430 can also be performed by the client devices 120A-N in other implementations, if appropriate. In addition, in some implementations, the functionality attributed to a particular component can be performed by different or multiple components operating together. The virtual meeting platform 420 or the server 430 can also be accessed as a service provided to other systems or devices through appropriate application programming interfaces, and thus is not limited to use in websites.

In some implementations, the one or more client devices 120A-N each include an audiovisual component that can generate audio and video data to be streamed to the virtual meeting manager 432. The audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 120A-N. In some implementations, the audiovisual component includes the image capture device 124A-N to capture images and generate video data (e.g., a video stream) of the captured data of the captured images.

As described previously, an audiovisual component of each client device 120A-N can capture images and generate video data (e.g., a video stream) of the captured data of the captured images. In some implementations, the client devices 120A-N transmit the generated video stream to virtual meeting manager 432. The audiovisual component of each client device 120A-N can also capture an audio signal representing speech of a user and generate audio data (e.g., an audio file or audio stream) based on the captured audio signal. In some implementations, the client devices 120A-N transmit the generated audio data to the virtual meeting manager 432.

In some implementations, each client device 120A-N includes a respective client application 405A-N, which can be a mobile application, a desktop application, a web browser, etc. The client application 405A-N can present, on a display device 407A-N of a client device 120A-N, one or more features of the application 405A-N for users to access the virtual meeting platform 420. For example, a user of client device 120A can join and participate in the virtual meeting 422 via a UI 408A presented on the display device 407A by the application 405A. The user can present a document to participants of the virtual meeting 422 using the UI 408A. Each of the UIs 408A-N can include multiple regions to present visual items corresponding to video streams of the client devices 120A-N provided to the server 430 for the virtual meeting 422.

In one or more implementations, the application 405A-N includes a virtual meeting API 406. The virtual meeting API 406 may include an API that allows the application 405A-N to control the image capture device 124A-N that is associated with the respective client device 120A-N, cause the image capture device 124A-N to perform one or more functions, or enable one or more features of the image capture device 124A-N. In some implementations, the testing manager 112 of the testing management server 110 of FIG. 1 determines the image capture device's 124A-N compliance with an API of a virtual meeting application. The virtual meeting application may include the application 405A-N, and the API may include the virtual meeting API 406.

In one implementation, determining the image capture device's 124A-N compliance with the virtual meeting API 406 includes causing an API request to be provided to the application 405A-N. The API request may include data which allows the application 405A-N that implements the virtual meeting API 406 to perform a function or enable a feature of the image capture device 124A-N. In one implementation, causing the API request to be provided to the application 405A-N may include causing the testing application 122 to provide the API request.

In some implementations, the function or feature of the image capture device 124A-N includes a continuous framing function. The continuous framing function may include the image capture device 124A-N continually tracking a target object (e.g., an image of a person displayed on the video display 134). The function or feature may include a split frames function. The split frames function may include the image capture device 124A-N generating multiple video streams from a single video stream (e.g., generating two video streams, each stream corresponding to a different person in the view of the image capture device 124A-N). In one or more implementations, the function or feature includes a pan, tilt, zoom (PTZ) function. The PTZ function can move the view of the image capture device to a location and zoom amount indicated in the API request. The function or feature may include an occupancy counting function. The occupancy counting function can return a value indicating the number of people in view of the image capture device 124A-N. The virtual meeting API 406 may include other implemented functions or features.

In one implementation, determining the image capture device's 124A-N compliance with the virtual meeting API 406 further includes determining a result of the API request. The application 405A-N implementing the virtual meeting API 406 can generate a response to an API request. The response may include one or more captured images. For example, responsive to obtaining an API request to perform a PTZ function, the application 405A-N can provide a response that includes an image captured by the image capture device 124A-N at the location and zoom amount that the image capture device 124A-N moved to when carrying out the API request. The response may include a data value. For example, responsive to obtaining an API request to perform an occupancy counting function, the application 405A-N can provide a response that includes a value that indicates the number of people in view of the image capture device 124A-N. The response may include data indicating an error message. For example, responsive to obtaining an API request to perform a function that is not implemented by the virtual meeting API 406, the application 405A-N can return an error message.

Determining the image capture device's 124A-N compliance with the virtual meeting API 406 may further include comparing the response to the API request with expected data. Expected data may include an image, a data value, or other data that the response can be compared with to determine whether the image capture device 124A-N complies with the virtual meeting API 406. For example, for a response to an API request to perform a PTZ function, the expected data may include an image at the location and zoom amount that the image capture device 124A-N should have moved to when carrying out the API request. In another example, for a response to an API request to perform an occupancy counting function, the expected data may include a value that the value included in the response should match.

Responsive to the compliance indicating that the image capture device 124A-N does not meet a threshold compliance with the API of the virtual meeting application, the testing manager 112 may cause performance of a corrective action associated with the software associated with the image capture device 124A-N. Causing the performance of the corrective action may include functionality similar to block 250 of the method 200, discussed above (e.g., reverting the software update, alerting a developer of the software associated with the image capture device, etc.). The threshold compliance may include a predetermined portion of the functions of the virtual meeting API 406.

Figure 5:
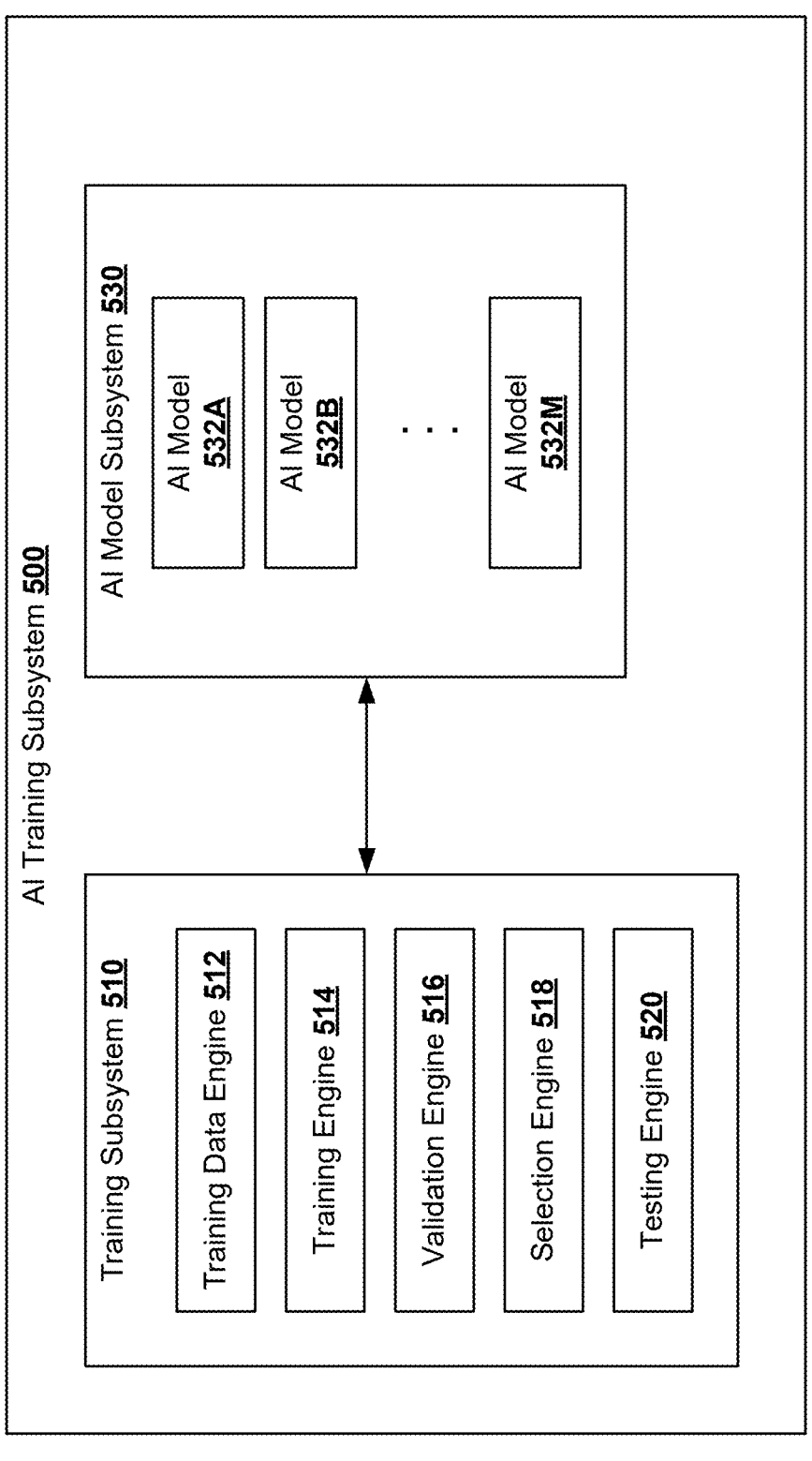
FIG. 5 depicts a schematic view illustrating an example artificial intelligence (AI) training subsystem for image capture device regression testing, in accordance with some implementations of the present disclosure.

FIG. 5 illustrates an example AI training subsystem 500, in accordance with implementations of the present disclosure. As illustrated in FIG. 5, the AI training subsystem 500 may include a training subsystem 510, which may include a training data engine 512, a training engine 514, a validation engine 516, a selection engine 518, or a testing engine 520. The AI training subsystem 500 may include an AI model subsystem 530. The AI model subsystem 530 may include one or more AI models 532A-M.

In one implementation, the AI model 532A-M includes one or more of artificial neural networks (ANNs), decision trees, random forests, support vector machines (SVMs), clustering-based models, Bayesian networks, or other types of machine learning models. ANNs generally include a feature representation component with a classifier or regression layers that map features to a target output space. The ANN can include multiple nodes ("neurons") arranged in one or more layers, and a neuron can be connected to one or more neurons via one or more edges ("synapses"). The synapses can perpetuate a signal from one neuron to another, and a weight, bias, or other configuration of a neuron or synapse can adjust a value of the signal. Training the ANN may include adjusting the weights or other features of the ANN based on an output produced by the ANN during training.

An ANN may include, for example, a convolutional neural network (CNN), recurrent neural network (RNN), or a deep neural network. A CNN, a specific type of ANN, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). A deep network may include an ANN with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. An RNN is a type of ANN that includes a memory to enable the ANN to capture temporal dependencies. An RNN is able to learn input-output mappings that depend on both a current input and past inputs. The RNN will address past and future measurements and make predictions based on this continuous measurement information. One type of RNN that can be used is a long short term memory (LSTM) neural network.

ANNs can learn in a supervised (e.g., classification) or unsupervised (e.g., pattern analysis) manner. Some ANNs (e.g., such as deep neural networks) may include a hierarchy of layers, where the different layers learn different levels of representations that correspond to different levels of abstraction. In deep learning, each level learns to transform its input data into a slightly more abstract and composite representation.

In one implementation, an AI model 532A-M includes a generative AI model. A generative AI model can deviate from a machine learning model based on the generative AI model's ability to generate new, original data, rather than making predictions based on existing data patterns. A generative AI model can include a generative adversarial network (GAN), a variational autoencoder (VAE), or a large language model (LLM). In some instances, a generative AI model can employ a different approach to training or learning the underlying probability distribution of training data, compared to some machine learning models. For instance, a GAN can include a generator network and a discriminator network. The generator network attempts to produce synthetic data samples that are indistinguishable from real data, while the discriminator network seeks to correctly classify between real and fake samples. Through this iterative adversarial process, the generator network can gradually improve its ability to generate increasingly realistic and diverse data.

Generative AI models also have the ability to capture and learn complex, high-dimensional structures of data. One aim of generative AI models is to model underlying data distribution, allowing them to generate new data points that possess the same characteristics as training data. Some machine learning models (e.g., that are not generative AI models) focus on optimizing specific prediction of tasks.

In some implementations, an AI model 532A-M is an AI model that has been trained on a corpus of data. In some implementations, the AI model 532A-M can be a model that is first pre-trained on a corpus of data to create a foundational model, and afterwards fine-tuned on more data pertaining to a particular set of tasks to create a more task-specific, or targeted, model. The foundational model can first be pre-trained using a corpus of data that can include data in the public domain, licensed content, and/or proprietary content. Such a pre-training can be used by the AI model 532A-M to learn broad elements including, image or speech recognition, general sentence structure, common phrases, vocabulary, natural language structure, and other elements. In some implementations, this first, foundational model is trained using self-supervision, or unsupervised training on such datasets.

In some implementations, the AI model 532A-M is then further trained or fine-tuned on organizational data, including proprietary organizational data. The AI model 532A-M can also be further trained or fine-tuned on organizational data associated with image capture device regression testing.

In some implementations, the second portion of training, including fine-tuning, may be unsupervised, supervised, reinforced, or any other type of training. In some implementations, this second portion of training includes some elements of supervision, including learning techniques incorporating human or machine-generated feedback, undergoing training according to a set of guidelines, or training on a previously labeled set of data, etc. In a non-limiting example associated with reinforcement learning, the outputs of the AI model 532A-M while training can be ranked by a user, according to a variety of factors, including accuracy, helpfulness, veracity, acceptability, or any other metric useful in the fine-tuning portion of training. In this manner, the AI model 532A-M can learn to favor these and any other factors relevant to users when generating a response. Further details regarding training are provided below.

In some implementations, an AI model 532A-M includes one or more pre-trained models, or fine-tuned models. In a non-limiting example, in some implementations, the goal of the "fine-tuning" is accomplished with a second, or third, or any number of additional models. For example, the outputs of the pre-trained model can be input into a second AI model 532A-M that has been trained in a similar manner as the "fine-tuned" portion of training above. In such a way, two more AI models 532A-M can accomplish work similar to one model that has been pre-trained, and then fine-tuned.

As indicated above, an AI model 532A-M may be one or more generative AI models 532A-M, allowing for the generation of new and original content. The generative AI model 532A-M can use other machine learning models including an encoder-decoder architecture including one or more self-attention mechanisms, and one or more feed-forward mechanisms. In some implementations, the generative AI model 532A-M includes an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative AI model 532A-M can also utilize the previously discussed deep learning techniques, including RNNs, CNNs, or transformer networks. Further details regarding generative AI models 532A-M are provided herein.

In some implementations, different AI models 532A-M of the one or more AI models 532A-M are different types of AI models 532A-M. Multiple AI models 532A-M of the one or more AI models 532A-M can form an ensemble.

In one implementation, the training subsystem 510 manages the training and testing of the one or more AI models 532A-M. The training data engine 512 can generate training data (e.g., a set of training inputs and a set of target outputs) to train an AI model 532A-M. In an illustrative example, the training data engine 512 can initialize a training set T to null. The training data engine 512 can add training data to the training set T and can determine whether training set T is sufficient for training the AI model 532A-M. The training set T can be sufficient for training the AI model 532A-M if the training set T includes a threshold amount of training data, in some implementations. In response to determining that the training set T is not sufficient for training, the training data engine 512 can identify additional training data and add the additional training data to the training set T. In response to determining that the training set T is sufficient for training, the training data engine 512 can provide the training set T to the training engine 514.

In some implementations, a piece of training data includes one or more images. The piece of training data may include a corresponding target output indicating an image quality of the one or more images. The image quality of the one or more images may include measurement values for different image characteristics of the one or more images. The target output image quality of the one or more images may indicate the quality of the one or more images as a human would perceive the image quality.

The training engine 514 can train the AI model 532A-M using the training data (e.g., training set T). The AI model 532A-M can refer to the model artifact that is created by the training engine 514 using the training data, where such training data can include training inputs and, in some implementations, corresponding target outputs (e.g., correct answers for respective training inputs). The training engine 514 can input the training data into the AI model 532A-M so that the AI model 532A-M can find patterns in the training data and configure itself based on those patterns.

Where the AI model 532A-M uses supervised learning, the training engine 514 can assist the AI model 532A-M in determining whether the AI model 532A-M maps the training input to the target output (the answer to be predicted). Where the AI model 532A-M uses unsupervised learning, the training engine 514 can input the training data into the AI model 532A-M. The AI model 532A-M can configure itself based on the input training data, but since the training data may not include a target output, the training engine 514 may not assist the AI model 532A-M in determining whether the AI model 532A-M provided a correct output during the training process.

The validation engine 516 may be capable of validating a trained AI model 532A-M using a corresponding set of features of a validation set from the training data engine 512. The validation engine 516 can determine an accuracy of each of the trained AI models 532A-M based on the corresponding sets of features of the validation set. Where the training data may not include a target output, validating a trained AI model 532A-M may include obtaining an output from the AI model 532A-M and providing the output to another entity for evaluation. The other entity may include another AI model trained to evaluate the output of the AI model that is undergoing training. The other entity may include a human. The validation engine 516 can discard a trained AI model 532A-M that has an accuracy that does not meet a threshold accuracy or that otherwise fails evaluation. In some implementations, the selection engine 518 is capable of selecting a trained AI model 532A-M that has an accuracy that meets a threshold accuracy. In some implementations, the selection engine 518 is capable of selecting the trained AI model 532A-M that has the highest accuracy of multiple trained AI models 532A-M. In some implementations, the selection engine 518 obtains input from another AI model or a human and can select a trained AI model 532A-M based on the input.

The testing engine 520 may be capable of testing a trained AI model 532A-M using a corresponding set of features of a testing set from the training data engine 512. For example, a first trained AI model 532A-M that was trained using a first set of features of the training set may be tested using the first set of features of the testing set. The testing engine 520 can determine a trained AI model 532A-M that has the highest accuracy or other evaluation of all of the trained AI models 532A-M based on the testing sets.

As described above, the AI training subsystem 500 can be configured and/or otherwise programmed to train an LLM. It should be noted that the AI training subsystem 500 can train an LLM in accordance with implementations described herein or in accordance with other techniques for training LLMs. For example, an LLM may be trained on a large amount of data, including images, and the LLM may be trained to output an image quality of an input image or set of images.

In some implementations, the AI model subsystem 530 selects an AI model 532A-M from the one or more AI models 532A-M. Selecting an AI model 532A-M may include selecting the AI model 532A-M for training or for use. For example, the training subsystem 510 can provide data to the AI model subsystem 530 indicating which AI model 532A-M is to be trained. The AI model subsystem 530 can obtain data from the testing manager 112 indicating which AI model 532A-M to use to generate output.

Figure 6:
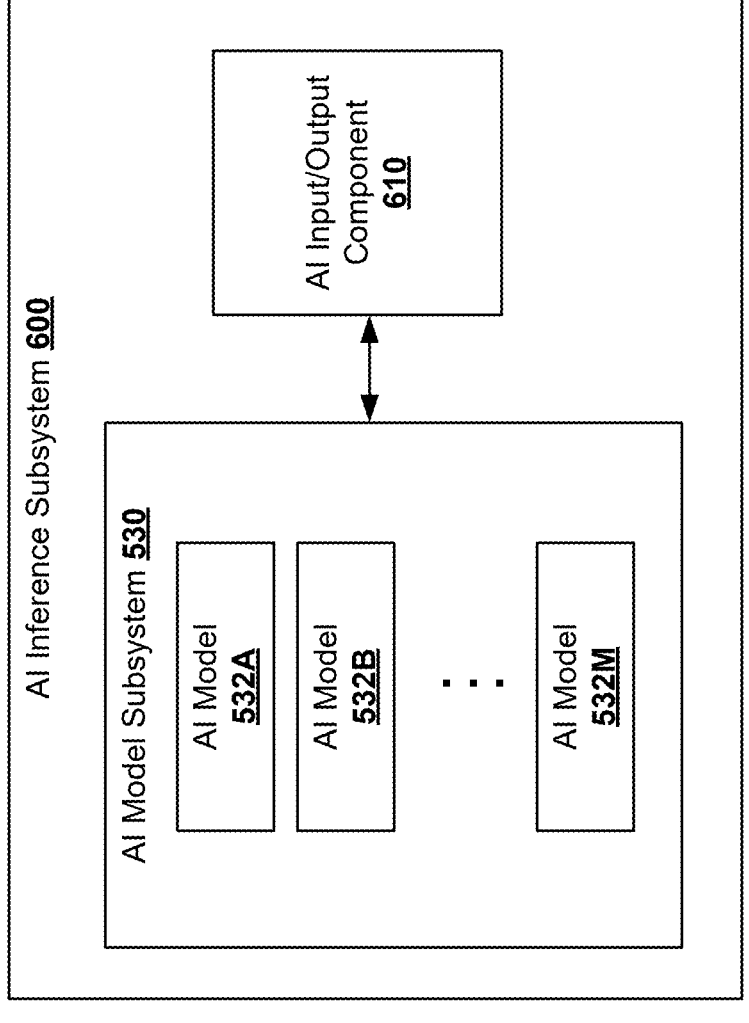
FIG. 6 depicts a schematic view illustrating an example AI inference subsystem for image capture device regression testing, in accordance with some implementations of the present disclosure.

FIG. 6 depicts one implementation of an AI inference subsystem 600. The AI inference subsystem 600 may include the AI model subsystem 530, which may include one or more AI models 532A-M. The AI inference subsystem 600 may include an AI input/output component 610. The AI input/output component 610 may be configured and/or otherwise programmed to feed data as input to an AI model 532A-M and obtain one or more outputs. In such implementations, the AI input/output component 610 feeds the first captured image(s) as input to an AI model 532A-M and obtain one or more outputs.

In some implementations, the testing manager 112 includes the AI inference subsystem 600. In some implementations, the AI inference subsystem 600 is not part the testing manager 112 and may, instead, be part of another system or sub-system or be an independent system in data communication with the testing manager 112. The testing manager server 110 or the client device 120 may include the AI training subsystem 500. In some implementations, the AI training subsystem 500 may be part of another system or sub-system or may be an independent system in data communication with the AI inference subsystem 600. The AI training subsystem 500 may send trained AI models 532A-M to the AI inference subsystem 600. In some implementations, the AI inference subsystem 600 includes the AI training subsystem 500.

In some implementations, as part of block 230 of the method 200, the testing manager 112 may provide the first captured image(s) to the AI input/output component 610. The AI input/output component 610 may provide the first image(s) as input to an AI model 532A-M, and the AI model 532A-M may determine an image quality of the first captured image(s). The AI model 532A-M may provide an output indicating the image quality to the AI input/output component 610, which may provide the output to the testing manager 112.

As indicated above, in some implementations, the AI model 532A-M includes a generative AI model, such as an LLM. In some implementations, the generative AI model 532A-M includes generative AI functionality. In such implementations, the generative AI model 532A-M generates new content based on provided input data (e.g., the first captured image(s)). The new content may include a determination of the image quality of one or more captured images input into the generative AI model 232A-M.

The generative AI model 532A-M can be supported by a prompt subsystem (not shown), which may reside on the testing management server 110, the testing manager 112, or the client device 120. The prompt subsystem may be configured and/or otherwise programmed to perform automated identification of, and facilitate retrieval of, relevant and timely contextual information for efficient and accurate processing of prompts by the AI model 532A-M. Using the computer network 150 (or another network), the prompt subsystem may be in communication with one or more of the testing management server 110, the testing manager 112, the data store 114, the client device 120, the testing application 122, or the external server 140. Communications between the prompt subsystem and the AI input/output component 610 may be facilitated by a generative model API, in some implementations. Communications between the prompt subsystem and the data store 114 or the external server 140 may be facilitated by a data management API. In additional or alternative implementations, the generative model API translates prompts generated by the prompt subsystem into unstructured natural-language format and, conversely, translate responses received from the AI model 532A-M into any suitable form (e.g., including any structured proprietary format as may be used by the prompt subsystem). Similarly, the data management API can support instructions that may be used to communicate data requests to the data store 114 or the external server 140 and formats of data received from such components.

In some implementations, the prompt subsystem includes a prompt analyzer to support various operations of this disclosure. For example, the prompt analyzer can receive an input (e.g., a prompt submitted by the testing manager 112) and generate one or more intermediate prompts for the generative AI model 532A-M to determine what type of data the generative AI model 532A-M may need to successfully respond to the input. Upon receiving a response from the generative AI model 532A-M, the prompt analyzer can analyze the response, form a request for relevant contextual data, submit the request to receive such data. The prompt analyzer can then generate a prompt for the generative AI model 532A-M that includes the original prompt and the contextual data. In some implementations, the prompt analyzer, itself, includes a lightweight generative AI model that can process the intermediate prompt(s) and determine what type of contextual data may be needed by the generative AI model 532A-M together with the original prompt to ensure a meaningful response from generative AI model 532A-M. The prompt subsystem may include (or may have access to) instructions stored on one or more tangible, machine-readable storage media of a computing device (e.g., the testing management server 110 or the client device 120) and executable by one or more processing devices of the computing device.

As part of block 230 of the method 200, in one implementation, the testing manager 112 uses the prompt subsystem to generate a generative AI prompt for use as input to a generative AI model 532A-M. The generative AI prompt may include the first captured image(s). The generative AI prompt may include a command for the generative AI model 532A-M to determine an image quality of the first captured image(s) included in the prompt. The command may include a command to determine the image quality as a human would perceive the image quality. The testing manager 112 may use the AI input/output component 610 to submit the prompt to the generative AI model 532A-M, and the generative AI model 532A-M may generate an output indicating the image quality of the first captured image(s). The AI input/output component 610 may then provide the output to the testing manager 112.

Figure 7:
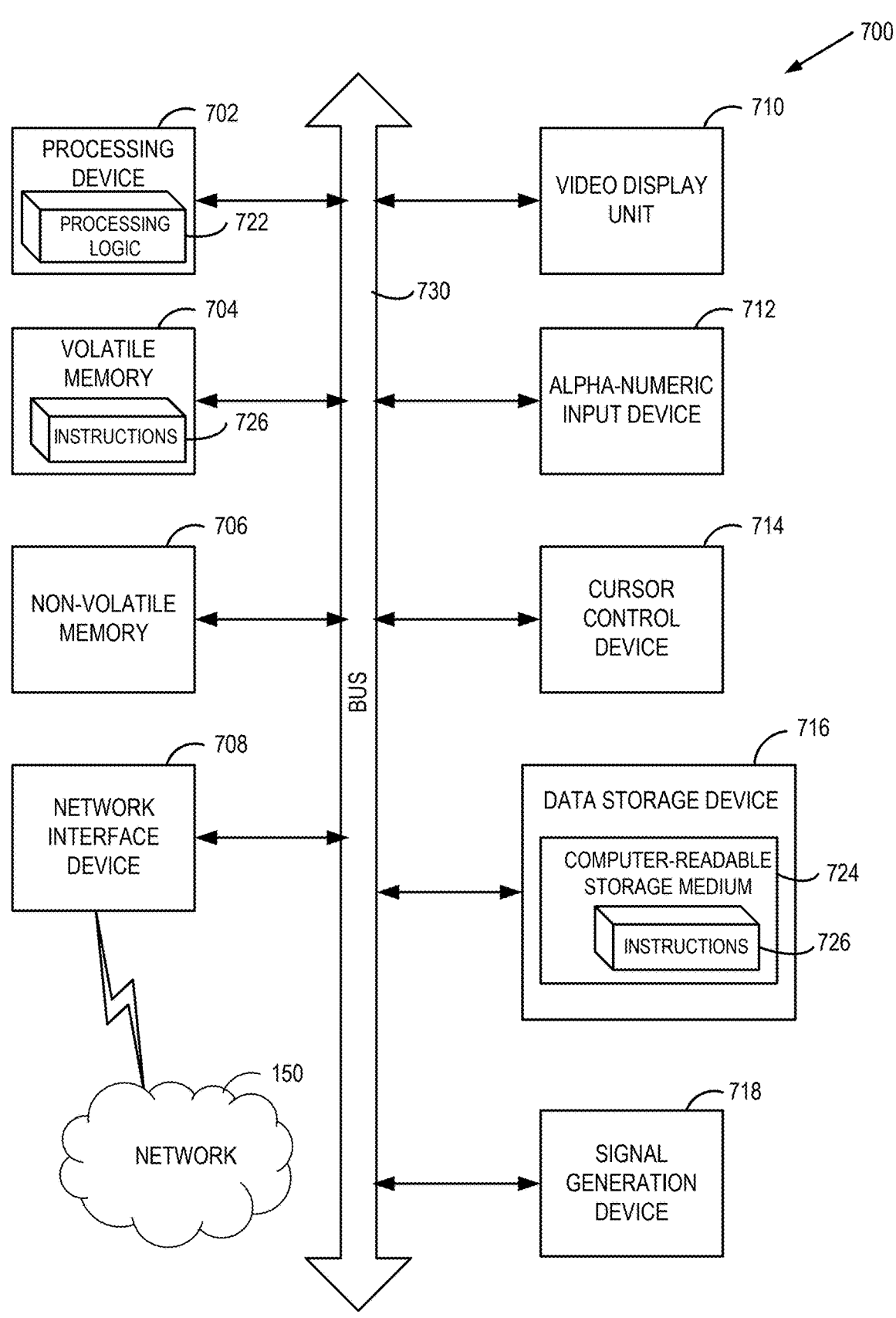
FIG. 7 depicts a block diagram of an example computer device capable of image capture device regression testing, in accordance with some implementations of the present disclosure.

FIG. 7 is a block diagram illustrating an example computer system 700, in accordance with implementations of the present disclosure. The computer system can be a computing device or other device discussed herein. The computer system 700 can be the testing manager server 110, client device 120, or external server 140 of FIG. 1, or the virtual meeting platform 420, the server 430, or the client devices 120A-N of FIG. 4. The computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a volatile memory 704 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 706 (e.g., flash memory, static random access memory (SRAM), etc.), and a data storage device 716, which communicate with each other via a bus 730.

The processing device 702 represents one or more general-purpose processing devices such as a microprocessor, CPU, GPU, or the like. More particularly, the processing device 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an ASIC, a field programmable gate array (FPGA), a digital signal processor (DSP), network processor, or the like. The processing device 702 is configured and/or otherwise programmed to execute instructions 726 (e.g., for performing the method 200) for performing the operations discussed herein.

The computer system 700 can further include a network interface device 708. The network interface device 708 can assist in data communication between computing devices. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 718 (e.g., a speaker).

The data storage device 716 can include a non-transitory machine-readable storage medium 724 (also computer-readable storage medium) on which is stored one or more sets of instructions 726. The instructions may embody any one or more of the methodologies or functions described herein. The instructions 726 can also reside, completely or at least partially, within the volatile memory 704 and/or within the processing device 702 during execution thereof by the computer system 700, the volatile memory 704 and the processing device 702 also constituting machine-readable storage media. The instructions 726 can further be transmitted or received over a network 720 via the network interface device 708.

In one implementation, the instructions 726 include instructions for image capture device regression testing. While the computer-readable storage medium 724 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the method 200 is depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the method could alternatively be represented as a series of interrelated states via a state diagram or events. Additionally, it should be appreciated that the method disclosed in this specification is capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
determining that software associated with an image capture device has received a software update;
causing the image capture device to capture one or more images of a testing environment, wherein the one or more images comprise an image of a humanoid-shaped object;
determining an image quality of the one or more captured images;
comparing the image quality of the one or more captured images with a threshold image quality; and
responsive to the image quality of the one or more captured images being below the threshold image quality, causing the software update of the software associated with the image capture device to be automatically reverted.

2. The method of claim 1, wherein the software associated with the image capture device comprises at least one of:
firmware of the image capture device; or
image capture software of a user device connected to the image capture device.

3. The method of claim 1, wherein the testing environment comprises:
a mount for the image capture device; and
a video display.

4. The method of claim 3, further comprising causing the video display to present one or more testing images while the image capture device captures the one or more images.

5. The method of claim 1, wherein:
the testing environment comprises an optical lens disposed on an optical lens mount disposed in front of the image capture device; and
causing the image capture device to capture the one or more images of the testing environment comprises causing the image capture device to capture the one or more images through the optical lens.

6. The method of claim 1, further comprising providing an alert to a computing device associated with an entity that provided the software update.

26

7. A system, comprising:
a memory; and
a processing device, coupled to the memory, configured to perform operations comprising:
determining that software associated with an image capture device has received a software update;
causing the image capture device to capture one or more images of a testing environment, wherein the one or more images comprise an image of a humanoid-shaped object;
determining an image quality of the one or more captured images;
comparing the image quality of the one or more captured images with a threshold image quality, and
responsive to the image quality of the one or more captured images being below the threshold image quality, causing the software update of the software associated with the image capture device to be automatically reverted.

8. The system of claim 7, wherein determining the image quality of the one or more captured images comprises determining the image quality of the one or more captured images using an artificial intelligence (AI) model and using the one or more captured images as input to the AI model.

9. The system of claim 7, wherein the threshold image quality comprises an image quality of one or more further images captured by the image capture device prior to the software associated with the image capture device receiving the software update.

10. The system of claim 7, wherein the testing environment further comprises:
a mount for the image capture device; and
a video display.

11. The system of claim 10, wherein the operations further comprise causing the video display to present one or more testing images while the image capture device captures the one or more images.

12. The system of claim 7, wherein the operations further comprise providing an alert to a computing device associated with an entity that provided the software update.

13. A non-transitory computer-readable storage medium comprising instructions, wherein the instructions, responsive to being executed by a processing device, cause the processing device to perform operations comprising:
determining that software associated with an image capture device has received a software update;
causing the image capture device to capture one or more images of a testing environment, wherein the one or more images comprises an image of a humanoid-shaped object wherein the testing environment comprises an optical lens disposed on an optical lens mount disposed in front of the image capture device, and wherein causing the image capture device to capture the one or more images of the testing environment comprises causing the image capture device to capture the one or more images through the optical lens;
determining an image quality of the one or more captured images;
comparing the image quality of the one or more captured images with a threshold image quality; and
responsive to the image quality of the one or more captured images being below the threshold image quality, causing the software update of the software associated with the image capture device to be automatically reverted.

14. The computer-readable storage medium of claim 13, wherein the operations further comprise:

determining the image capture device's compliance with an application programming interface (API) of a virtual meeting application; and responsive to the compliance indicating that the image capture device does not meet a threshold compliance 5 with the API of the virtual meeting application, causing performance of a action associated with the software associated with the image capture device.

15. The computer-readable storage medium of claim 13, wherein the operations further comprise providing an alert to 10 a computing device associated with an entity that provided the software update.

\* \* \* \* \*